UNITED STATES PATENT OFFICE.

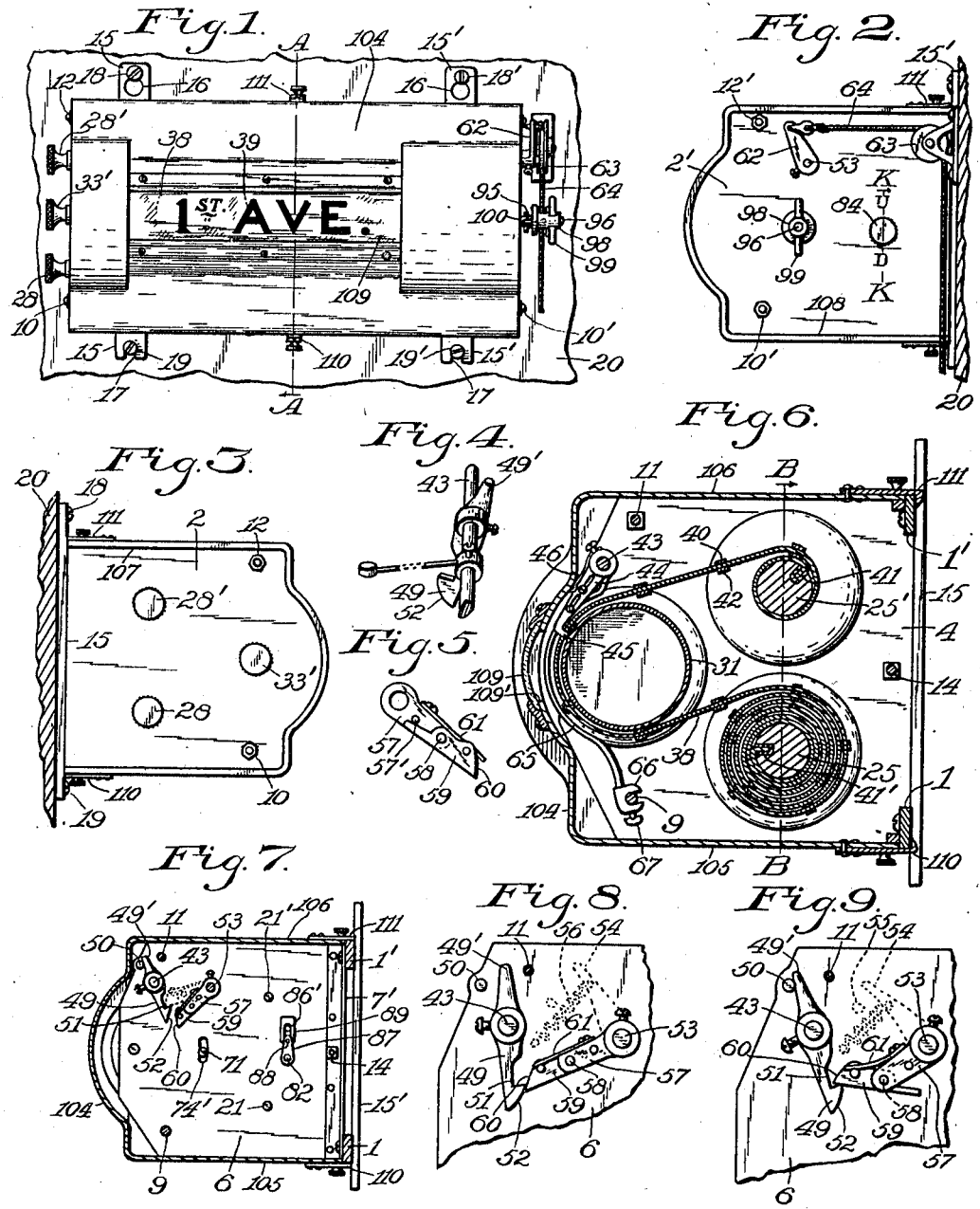

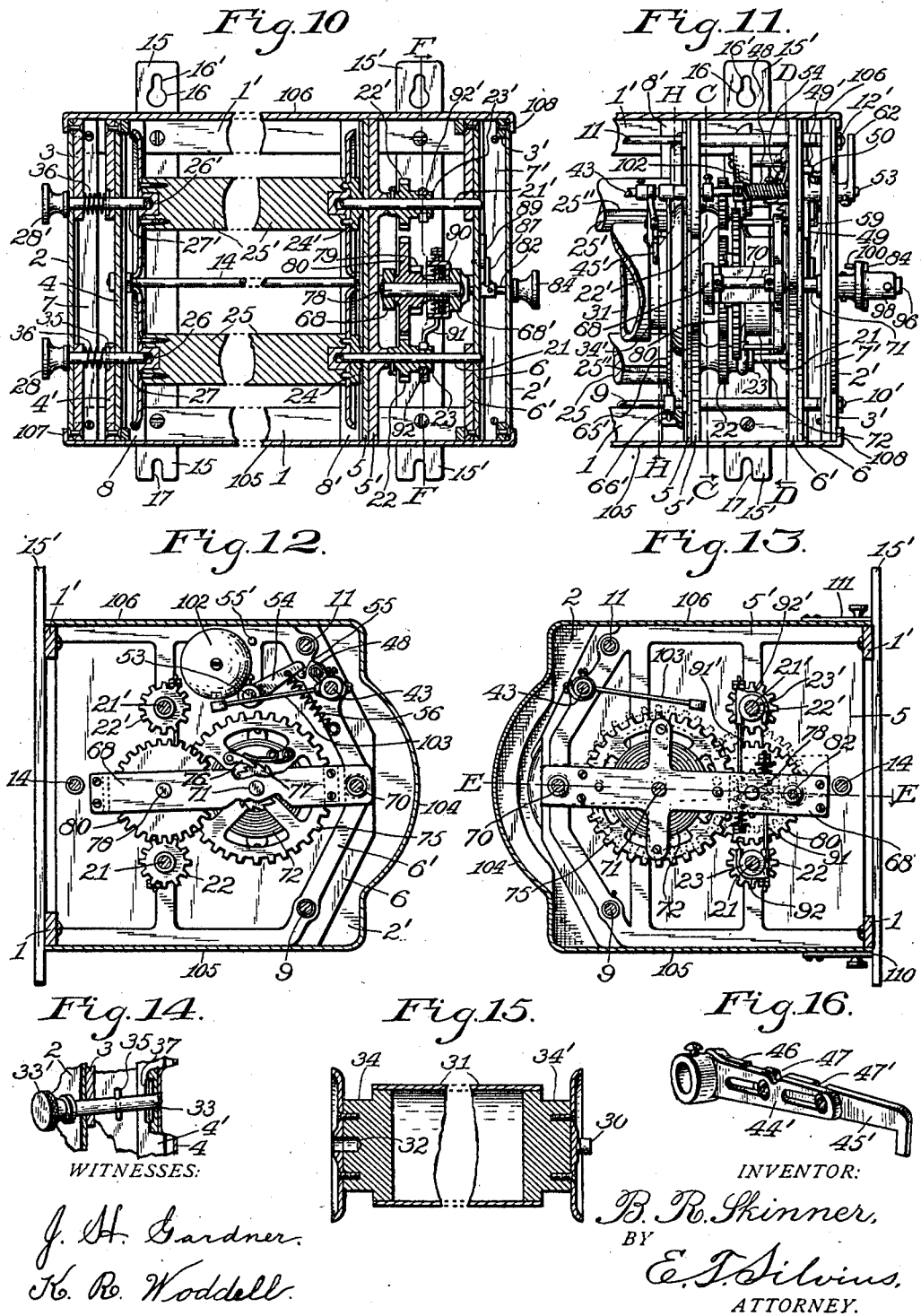

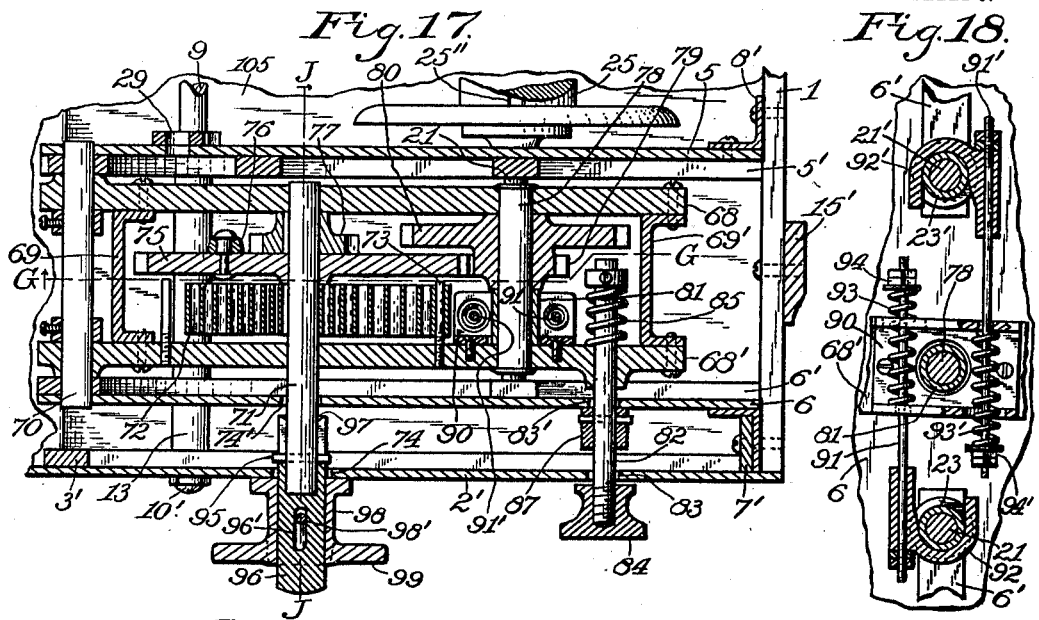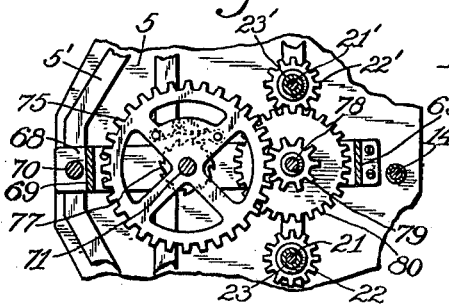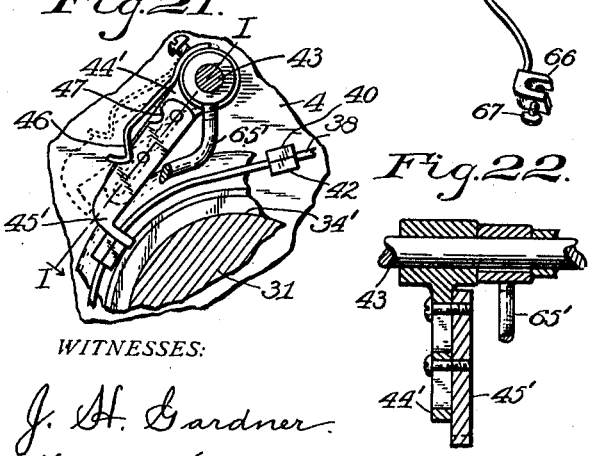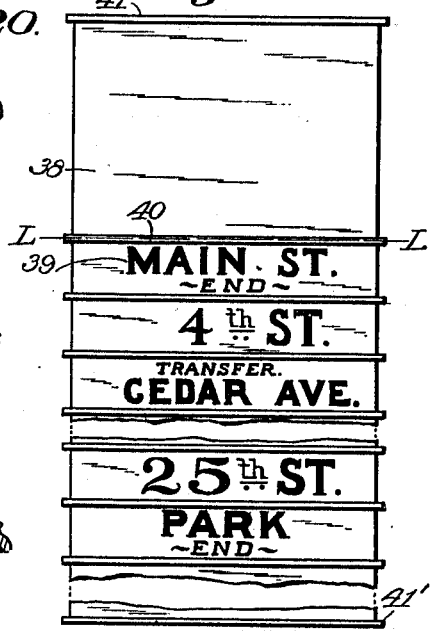

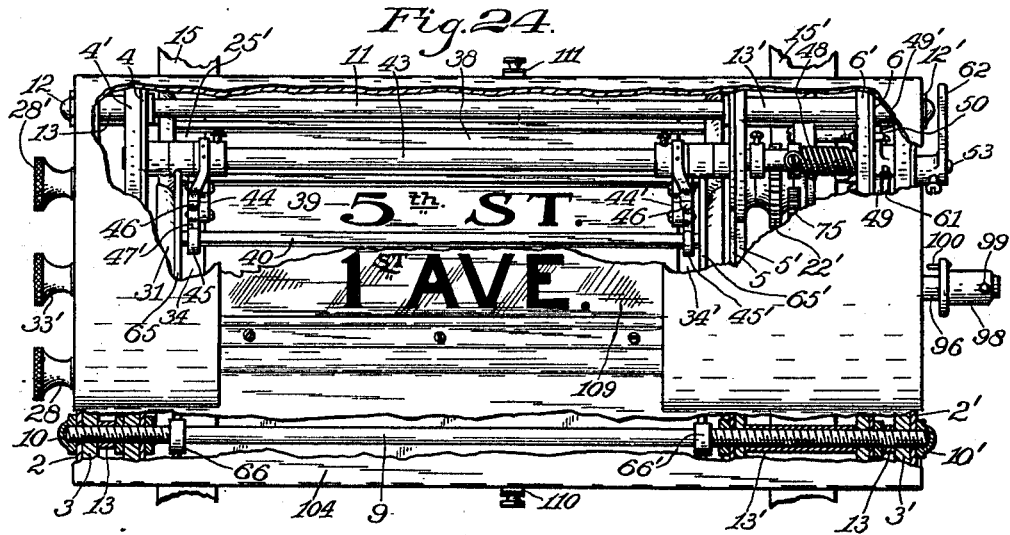

BURR R. SKINNER, OF ABERDEEN, SOUTH DAKOTA.

STATION INDICATOR OR ADVERTISER.

991,904.  Specification of Letters Patent.  Patented May 9, 1911.

Application filed May 25, 1910. Serial No. 563,288.

*To all whom it may concern:*

Be it known that I, BURR R. SKINNER, a citizen of the United States, residing at Aberdeen, in the county of Brown and State of South Dakota, have invented certain new and useful Improvements in Station Indicators or Advertisers; and I do declare the following to be a full, clear, and exact description of the invention, reference being had to the accompanying drawings, and to the letters and figures of reference marked thereon, which form a part of this specification.

This invention relates to a mechanical annunciator or advertiser for use in cars, public places or elsewhere, either for indicating the stations or streets on lines of travel of cars or other passenger vehicles, or for advertising purposes, and which may be used in stations for announcing the departure of trains or cars on various roads, the invention having reference more particularly to a station indicator or advertiser that is adapted to be operated either by hand or by mechanism at intervals.

The object of the invention is to provide an improved indicator or annunciator of the above mentioned character which may include a name ribbon of cheap construction, and mechanism whereby the ribbon may be operated accurately and reliably, to the end that a relatively large number of name ribbons may be provided at relatively small cost to be used with each machine at different times as occasion may require, especially for advertising purposes; a further object being to improve the construction of the machine to simplify the operation of changing the name ribbons therein as occasion may require.

The invention comprises essentially a name ribbon, and rollers therefor, a casing having a sight opening, a drum for guiding the ribbon close to the sight opening, a motor for operating either one of the rollers whereby to move the ribbon, and mechanism operating in connection with the ribbon for stopping the ribbon with the names or signs thereon opposite the sight-opening, and in novel mechanism for operating and controlling the stopping means; the invention consisting further in the parts, and combinations and arrangements of parts, as hereinafter particularly described and claimed, being improvements in the station indicator illustrated in Letters Patent No. 895,118, granted to me August 4, 1908, the construction in the present case being such as to permit any desired number of machines to be connected together so as to be operated in unison, as described in said Letters Patent.

Referring to the drawings, Figure 1 is a front elevation of the machine as preferably constructed and arranged; Fig. 2, a side elevation; Fig. 3, an opposite side elevation; Fig. 4, a fragmentary perspective view of parts of the operating mechanism; Fig. 5, a side elevation of one of the parts of the mechanism; Fig. 6, a vertical section on the line A A in Fig. 1; Fig. 7, a vertical section taken at the right hand side of the machine; Figs. 8 and 9, enlarged reproductions of portions of Fig. 7 with the mechanism in different positions; Fig. 10, a vertical section on the line B B in Fig. 6; Fig. 11, a fragmentary front elevation of the motor and other mechanism with the casing thereof broken away; Fig. 12, a vertical section on the plane of the line C C in Fig. 11; Fig. 13, a section on the plane of the line D D in Fig. 11; Fig. 14, a fragmentary detail showing the arrangement of the removable center-pins of the rollers and drum; Fig. 15, a longitudinal central sectional view of the guide-drum partially broken away; Fig. 16, a perspective view of one of the two self adjusting devices for engaging and stopping the ribbon when moving in either direction; Fig. 17, a fragmentary horizontal section on the plane of the line E E in Fig. 13; Fig. 18, a fragmentary vertical section approximately on the plane of the line F F in Fig. 10; Fig. 19, a fragmentary vertical section approximately on the plane of the line G G in Fig. 17; Fig. 20, a perspective view of one of the guides for the ribbon; Fig. 21, a fragmentary section approximately on the line H H in Fig. 11; Fig. 22, a fragmentary section on the line I I in Fig. 21; Fig. 23, a plan of the name ribbon partially broken away; Fig. 24, a front elevation of the machine with the casing partially broken away to expose mechanism therein; Fig. 25, a fragmentary section showing details of the key for winding the spring of the motor and whereby the motor may be locked, as on the line J J in Fig. 17; Fig. 26, a fragmentary elevation of the machine frame; Fig. 27, a perspective view of the combined winding and locking key; Fig. 28, a fragmentary elevation of the frame and a guide thereon; Fig. 29, a fragmentary section approximately on the line K K in Fig. 2; and Fig. 30, a sectional view of the ribbon on the line L L in Fig. 23.

In the drawings similar reference characters indicate corresponding elements or features of construction throughout the various figures thereof herein specifically referred to.

The frame of the machine comprises two horizontal base bars 1 and 1' to which are suitably secured two sides 2 and 2' which are preferably composed of metal plates and constitute also portions of the casing, the sides having reinforcements 3 and 3' on the inner sides thereof, respectively. The frame includes also a division plate 4 provided with reinforcement 4' and arranged near the side 2; also division plates 5 and 6 provided with reinforcement 5' and 6' respectively relatively near the side 2', the division plates being secured also to the base-bars, there being frame bars 7 and 7' connected to the end portions of the base bars adjacent to the sides 2 and 2' respectively, other frame bars 8 and 8' being connected also to the base bars and to the division plates 4 and 5 respectively, the back or rear of the frame being open when dismounted. A frame bar 9 has screw-threaded ends and extends through the lower forward portions of the sides 2 and 2' and has nuts 10 and 10' on the ends thereof in contact with the sides, and a similar frame-bar 11 extends through the upper forward portions of the sides and has nuts 12 and 12' thereon in contact with the sides, the frame bars extending through the division plates and having spacing thimbles 13, 13' thereon between the plates. A frame-bar 14 preferably is connected to the rear portions of the division plates 4 and 5. Two supporting bars 15 and 15' are secured to the base-bars 1 and 1' and project beyond them, their upper portions having each an aperture 16 and a slot 16' extending from the aperture, the lower end portions having each a slot 17 therein, thus enabling the frame of the machine to be readily hung securely on screws 18 and 18' and 19 and 19' secured to a suitable support 20 which may be a back-board or may constitute a portion of any structure on which it is desired to mount the machine, the machine frame being detachable from the support 20 by simply raising the frame slightly and then drawing it forward from the screws, as will be readily understood, which enables the attendant to readily replace any machine with another having a differently lettered ribbon therein.

A pair of roller shafts 21 and 21' are mounted rotatively in the division plates 5 and 6 and have pinions 22 and 22' secured thereto respectively adjacent to the plate 5 through which the shafts extend, the pinions having grooved hubs 23 and 23' thereon adapted to serve as brake-drums. The projecting ends of the shaft are provided with relatively fixed driving heads 24 and 24' respectively to which rollers 25 and 25' are detachably connected, each roller having a longitudinal groove 25" therein. The farther ends of the rollers have sockets 26 and 26' therein respectively into which center-pins 27 and 27' are removably inserted for supporting the rollers rotatively, the center-pins being mounted in the side 2 and the divisional plate 4 and provided with knobs 28 and 28', respectively, for withdrawing them from the rollers. The plate 5 on the side thereof opposite the plate 4 has a journal bearing 29 thereon forward of the plane of the rollers to support the journal 30 of the drum 31 which is provided for guiding the ribbon, the drum having a socket 32 therein to receive a center-pin 33 which is mounted also in the side 2 and plate 4 and has a knob 33' at the outer side of the side 2 for withdrawing the center-pin. The drum has grooves 34 and 34' in opposite end portions thereof. Each center-pin 28, 28' and 33 has a pin 35 therein against which one end of a spring 36 is seated, the opposite end of the spring being seated against the end 2 or its reinforcement to normally hold the center-pin in normal position, in which position the pins 35 are seated in recesses 37 in the plate 4 or its reinforcement to prevent the center-pins from rotating when the rollers are rotating.

A name ribbon 38 is employed which may be composed of any suitable flexible material such as webbing or window-shade material, and suitable lines 39 are printed or painted thereon to represent station or street names or different advertisements, the outer side of the name ribbon on which the reading matter is placed having also a suitable number of metallic bars 40 secured thereto and extending slightly beyond the sides of the ribbon, the bars being equi-distant apart, one above each line of reading matter, the ends of the ribbon having metallic binding 41 and 41' thereon and inserted in the grooves that are in the rollers 25 and 25' for connecting the ribbon thereto. The stop-bars 40 are composed of relatively thin metal and may be of sufficient width to afford the requisite strength for stopping the machinery and the ribbon, and preferably opposite plates 42 are secured to the inner side of the ribbon and extend beyond the side edges thereof, in which case preferably the bars 40 each have one end 40' turned over one end of the opposite bar 42 and secured thereto, and the bar 42 has an end 42' turned over the opposite end of the bar 40 and secured thereto, so as to provide compound bars of two ply thickness having three-ply ends, the latter being engaged by the stopping devices as will further appear. The name ribbon extends over the forwardly presented side of the guide-drum with the ends of the stop-bars extending over the grooves 34 and 34'.

A rock-shaft 43 is mounted in the upper forward portions of the plates 4 and 6 and also in the plate 5, so as to be above the guide-drum 31, and it has two arms 44 and 44' secured thereto opposite the grooves in the drum, the arms extending downwardly and forwardly and having lugs 45 and 45' mounted slidingly thereon in any suitable manner so as to render the arms extensible or contractible. The extremities of the lugs are adapted to be engaged by either side of each stop-bar on the ribbon, the lugs being normally held in the grooves so that stop-bars can not slip under them accidentally. The arms have each a spring catch 46 mounted thereon which normally extends into either one of two notches 47 and 47' in the body portions of the lugs for preventing the lugs from accidentally shifting after readjustment on the arms, the spring catches being readily forced out of the notches when the lugs are forcibly moved. A spring 48 is coiled about the rock shaft and has one end suitably secured thereto and its opposite end secured to the plate 6, so as to spring-press the lugs into the grooves in the guide-drum. A lever 49 is secured to the rock-shaft 43 between the end 2' and the plate 6 of the frame and has an arm 49' thereon normally in contact with a fixed stop 50 on the adjacent part of the frame. One side of the lever has a recess 51 therein, and the lever has also a beveled end 52. An operating shaft 53 is mounted rotatively in the side 2' and the plate 6 and has an arm 54 on the inner end thereof normally held in contact with a fixed stop 55 by means of a spring 56 suitably supported, the arm being movable against an opposite stop 55'. The shaft 53 has a knuckled finger secured thereto which comprises a fixed part 57 having a pivot 58 on which an end part 59 is mounted and normally engages a stop 57' (see Fig. 5) with which the part 57 is provided, the part 59 having a beveled end 60 for sliding against the end 52 of the lever 49, a spring 61 being mounted on the part 57 and extending into engagement with the part 59 for normally preventing pivotal movement of the end part of the finger, but permitting pivotal movement when the arm moves downward so that the finger may be withdrawn from the recess 51 in the lever 49. An operating arm 62 is secured to the outer end of the shaft 53 externally to the side 2' whereby to periodically withdraw the lugs from contact with the stop-bars of the name-ribbon. Preferably a guide-sheave 63 is mounted on the support 20 and a cable 64 is connected to the arm 62 and extends over the guide-sheave for moving the arm in one direction, the arm being retracted by the spring 56. The cable may be extended to any desired point for operation thereof. Two curved guides 65 and 65' are hung pivotally on the rock shaft 43 and extend downward opposite the end portions of the guide-drum to the frame-bar 9 and have slotted clamp ends 66 and 66', respectively, provided each with a set-screw 67 whereby the guides are connected detachably to the frame-bar, and the stop-bars 40 slide in contact with the guides for preventing the stop-bars from accidentally rising over the ends of the lugs when the ribbon is slack, as when placing a new ribbon in position in the machine.

It will be understood from the foregoing that the lugs 45 and 45' are designed to move a distance on their supporting arms equal to the width of a stop-bar 40, and when the roller 25 is winding the ribbon thereon the lugs are first drawn downward or outward on their arms by means of the first stop-bar that comes in contact therewith, the lugs being then held in the desired position by the springs 46. When the roller 25' begins to wind up the ribbon the first stop-bar coming in contact with the lugs move them upward or inward until stopped, in which position they are then retained by the springs 46.

A suitable motor-frame is provided and mounted between the frame plates 5 and 6 and it comprises two main bars 68 and 68' mounted pivotally on a shaft 70 that is suitably mounted in the forward portions of the two frame plates, and also cross-bars 69 and 69' secured to the main bars. The motor frame has a main shaft 71 mounted rotatively therein, the inner end of a spring 72 being secured to the shaft and the outer end of the spring connected to a stud 73 secured to the motor frame. The shaft 71 extends through slots 74 and 74' in the side 2' and frame plate 6 respectively. A gear wheel 75 is mounted rotatively on the shaft 71 and has a pawl 76 mounted thereon, a ratchet-wheel 77 being secured to the shaft adjacent to the gear-wheel and engaged by the pawl. A shaft 78 is mounted in the motor frame and rotatively supports a pinion 79 and a gear-wheel 80 that are preferably formed integrally or so that one rotates the other, the pinion being in mesh with the gear-wheel 75, and the gear wheel 80 being movable into engagement either with the pinion 22 or with the pinion 22' on pivotal movement of the motor frame, for operating the winding rollers of the name ribbon. The shaft 78 has a suitable collar 81 thereon to prevent the pinion 79 from moving longitudinally on the shaft. The motor frame is provided with controlling and locking means comprising a rod 82 which is mounted to slide in the main-bar 68' and extends through in opposite directions, the rod extending also through slots 83 and 83' in the side 2' and frame plate 6 respectively, the outer end of the rod having a pull knob 84 thereon exterior to the side 2', and a spring 85 is seated against the inner side of the bar 68' and suitably connected to the rod 82 so as to normally press the rod inward. The plate 6 has two sockets 86 and 86' near the slot 83', and an arm 87 is secured to the rod 82 between the side 2' and the plate 6 and has a locking pin 88 thereon adapted to enter the sockets, the locking pin extending into a slotted guide 89 for guidance into either one of the sockets when retracted on movement of the shaft 82 outward, during which the motor frame may be moved pivotally for reversing the motion of the name-ribbon.

In order to keep the name ribbon taut the rollers are provided with brakes which are automatically increased in tension on the roller from which the ribbon is being unwound and the tension decreased on the opposite roller when winding ribbon thereon, the brake serving also to in a measure govern the speed of the motor so that at times it may be permitted to run faster than at other times on readjustment of the brakes. An abutment 90 is secured to the bar 68' of the motor frame and has two brake-rods 91 and 91' suitably mounted and guided therein, one brake-rod having a brake-shoe 92 thereon that is in contact with the grooved hub 23 of the pinion 22, the other brake-rod having a brake shoe 92' thereon that is in contact with the hub 23', the brake rods being provided with tension springs 93, 93', respectively, that are seated against the abutment and also against adjusting nuts 94 and 94' on the brake-rods, the springs being adapted to draw the brake-shoes toward the abutment. It will be clear, therefore that when the rod 82 is moved upward so that the roller 25' may be rotated the tension on the brake-shoe 92' will be diminished and the tension on the other brake-shoe increased so as to tend to retard the movement of the roller 25 while the ribbon is unwound therefrom.

The shaft 71 is provided with a projecting pin 95 to be engaged by a combined winding and locking key which comprises a stem 96 having a socket 97 in the inner end thereof to receive the end of the shaft 71, the wall of the socket having slits 97' therein to receive the pin 95 whereby the shaft may be rotated, the walls of the socket embracing the shaft closely so as to be held frictionally on the shaft. A sleeve 98 is mounted on the stem 96 to move longitudinally thereon and is prevented from rotating on the stem by means of a pin 98' extending through a slot 96' in the stem, the sleeve being provided with a cross-bar 99 whereby the sleeve and the stem may be rotated for winding the motor spring. The sleeve 98 is provided with a pin 100 that may be pushed into a socket 101 beneath the slot 74 in the side 2' or into a socket 101' above the slot, depending on the relative position of the motor frame, to prevent rotation of the stem 96 and thereby preventing the spring from operating the gear wheels and rollers in case the name ribbon is changed while the motor spring is under tension.

Preferably a gong 102 is mounted on the frame between the plates 5 and 6, and a hammer 103 is mounted on the rock-shaft 43 so that when the rock-shaft is turned to raise the arms 44 and 44' and suddenly released, the hammer is caused to strike the gong to call attention to the change of name or sign appearing on the ribbon.

A removable casing comprises a front 104, and integral bottom and top plates 105 and 106 that fit closely to the sides 2 and 2' and therewith inclose the ribbon and motor mechanism therefor, the casing having flanges 107 and 108 that engage the exterior of the sides 2 and 2' and serve as guides when placing the casing onto the frame. The front 104 has a transparent panel 109 thereon covering a sight opening 109' in the front, and the front is so shaped as to conform to the frame and closely cover the machanism and permit the arms 44 and 44' to move freely, the design being such as to permit the transparent panel to be quite close to the ribbon so that the reading thereon may be clear through the sight opening. The casing is provided with spring catches 110 and 111 that engage the frame bars 1 and 1' and permit the casing to be quickly removed when necessary to change the ribbon, in order that the rollers may be accessible for connecting or disconnecting the ribbon therewith.

In practical use the sleeve 98 is moved outward on the stem 96 and the stem being then rotated the spring 72 is wound up so as to afford power for driving the ribbon. The stem 96 may then be removed if desired. If the shaft 82 be moved upward and the lock-pin 88 inserted in the socket 86' it is clear that the motor is then connected operatively with the roller 25' which will wind the ribbon thereon and unwind it from the opposite roller, the ribbon being guided by the drum 31 close to the sight-opening until one of the bars 40 is brought into contact with the lugs 45 and 45' which accurately stops the movement of the ribbon and thereby stops the motor. After the reading or sign is exposed a sufficient length of time as may be desired, the arm 62 is moved rearwardly and brings the finger end 59 into contact with the lever 49 so as to partially rotate the shaft 43 and move the lugs out of the way of the stop-bar, the ribbon being started immediately on being released. When the end 59 moves until it is received in the recess 51 the lever 49 is instantly retracted so as to permit the lugs to again fall to normal position for again arresting the ribbon when engaged by the next stop bar. On release of the arm 62 so that it is automatically retracted, the movement of the part 57 of the knuckled finger causes pivotal movement of the end part 59 which is thus dragged out of the recess 51, and when clear of the lever 49 resumes its normal condition. In Fig. 8 the lever 49 is shown as being operated and in Fig. 9 it is in normal position with the knuckled finger being moved from disengagement therewith. Other results of operation will be readily understood from the foregoing description and reference to functions of the mechanism.

Having thus described the invention, what is claimed as new, is—

1. A station indicator or advertiser including a ribbon, stop-bars secured to the ribbon, means for moving the ribbon forward or backward, a rock-shaft provided with automatically extensible or contractible arms adapted to contact with either forward or rearward side of a stop-bar to be extended or contracted thereby, a spring for holding the arms in normal position, and a device for moving the arms away from the stop-bars.

2. A station indicator or advertiser including a pair of rollers, a guiding drum, a ribbon extending about the drum and connected to the rollers, stop-bars secured to the ribbon, a rock-shaft opposite the drum, and a pair of arms secured to the rock-shaft and having each a lug mounted thereon and movable longitudinally thereof a distance approximately equal to the width of a stop-bar, the lugs being movable into or out of the path of the stop-bars.

3. A station indicator or advertiser including a ribbon, stop-bars secured to the ribbon, means for moving the ribbon forward or backward, a rock-shaft, an arm secured to the rock-shaft, a lug movable on the arm longitudinally thereof and normally in the path of the stop-bars for arresting the ribbon, the lug having two notches therein, a spring-catch mounted on the arm and normally extending into either one of the notches, and an operating arm on the rock-shaft for moving the lug away from the stop-bars.

4. A station indicator or advertiser including a frame comprising frame-plates and a frame-bar, a guide-drum rotatively mounted in the frame-plates, a rock-shaft mounted in the frame-plates above the guide-drum, a ribbon movable in contact with the guide-drum, stop-bars secured to the ribbon, lugs mounted on the rock-shaft and normally extending into the path of the stop-bars, guides hung pivotally on the rock-shaft and detachably connected to the frame-bar, the guides being adjacent the lugs and guiding the stop-bars thereto, and means for operating the lugs.

5. A station indicator or advertiser including a ribbon, stop-bars secured to the ribbon, means for moving the ribbon, a rock-shaft having lugs thereon to engage the stop-bars and provided with an operating-arm having a recess in one side thereof, a rotative shaft, a finger on the shaft having a pivot, a finger-end connected to the pivot and having a beveled end to move the operating-arm and then enter the recess, a spring mounted on the finger and pressing on the finger-end, a stop-device limiting pivotal movement of the finger-end in one direction, an arm secured to the shaft to operate the finger, and a spring for retracting the finger and causing pivotal movement of the finger-end in the opposite direction to withdraw it from the recess.

6. A station indicator or advertiser including a frame, a name-ribbon mounted movably in the frame, a motor mounted in the frame for moving the name-ribbon, a guide-drum mounted in the frame in contact with the name-ribbon and having grooves in the end portions thereof, stop-bars secured to the name-ribbon and extending to the planes of the grooves, a rock-shaft mounted in the frame, two lugs mounted on the rock-shaft and movable thereby into or out of the grooves and to or from the path of the stop-bars, and a casing secured to the frame and having a sight-opening therein extending between the planes of the two lugs.

In testimony whereof, I affix my signature in presence of two witnesses.

BURR R. SKINNER.

Witnesses:
MARSHALL H. BAEDEN,
K. N. OHLHOUSE.

---

Copies of this patent may be obtained for five cents each, by addressing the "Commissioner of Patents, Washington, D. C."